United States Patent [19]

Marcout et al.

[11] Patent Number: 5,839,613
[45] Date of Patent: Nov. 24, 1998

[54] DEVICE FOR PUSHING A TUBE OF PLASTICS MATERIAL FOR INTERNALLY CASING A METAL PIPING TO BE RENOVATED

[75] Inventors: Alain Marcout, Chaponost; Marcel Teillaud, Neuville-Sur-Saone; Yves Berger, La Mulatiere, all of France

[73] Assignee: Gaz De France, Paris, France

[21] Appl. No.: 816,428

[22] Filed: Mar. 14, 1997

[51] Int. Cl.⁶ ..................................................... B65H 20/00
[52] U.S. Cl. .......................... 226/176; 226/182; 226/186
[58] Field of Search .................................. 226/175, 176, 226/177, 188, 189, 186, 182

[56] References Cited

U.S. PATENT DOCUMENTS

| | | | |
|---|---|---|---|
| 3,459,354 | 8/1969 | Land et al. | 226/189 X |
| 3,473,715 | 10/1969 | Shuey, Jr. | 226/108 |
| 3,506,174 | 4/1970 | Shuey, Jr. | 226/177 X |
| 3,546,890 | 12/1970 | Ede | 226/189 X |
| 3,632,031 | 1/1972 | Gurner | 226/189 X |
| 3,713,301 | 1/1973 | Bryant . | |
| 3,986,652 | 10/1976 | Perkins | 226/189 X |
| 4,285,454 | 8/1981 | Plumettaz | 226/174 |
| 4,445,668 | 5/1984 | Sauber | 226/177 X |
| 4,779,784 | 10/1988 | Giroux | 226/176 X |

FOREIGN PATENT DOCUMENTS

| | | |
|---|---|---|
| 2 556 812 | 6/1985 | France . |
| 32 38 054 | 4/1984 | Germany . |
| 2 261 687 | 5/1993 | United Kingdom . |

*Primary Examiner*—Michael Mansen
*Attorney, Agent, or Firm*—Pennie & Edmonds LLP

[57] ABSTRACT

A pushing device which includes a frame supporting at least one powered train of wheels the drive surface of which is made from rubber for driving a plastics tubing through friction and for imparting thereto a continuous motion inside of a metal piping to be renovated, the invention being applicable to the renovation of systems of fluid-conveying buried metal pipings.

8 Claims, 2 Drawing Sheets

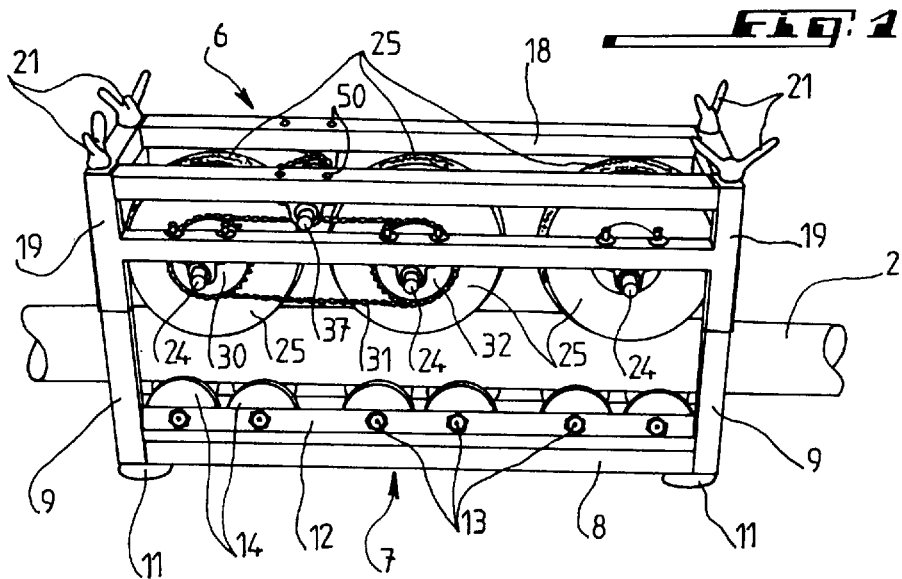
Fig. 1
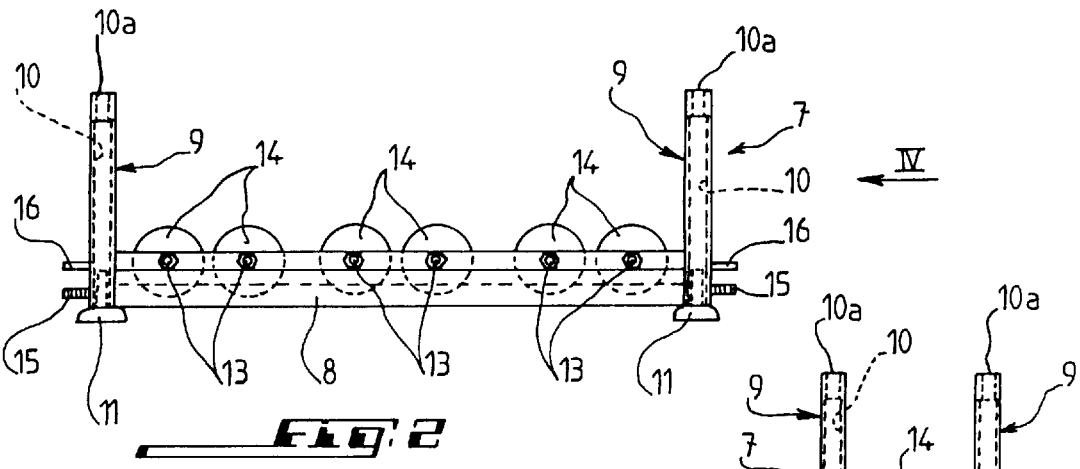
Fig. 2
Fig. 4
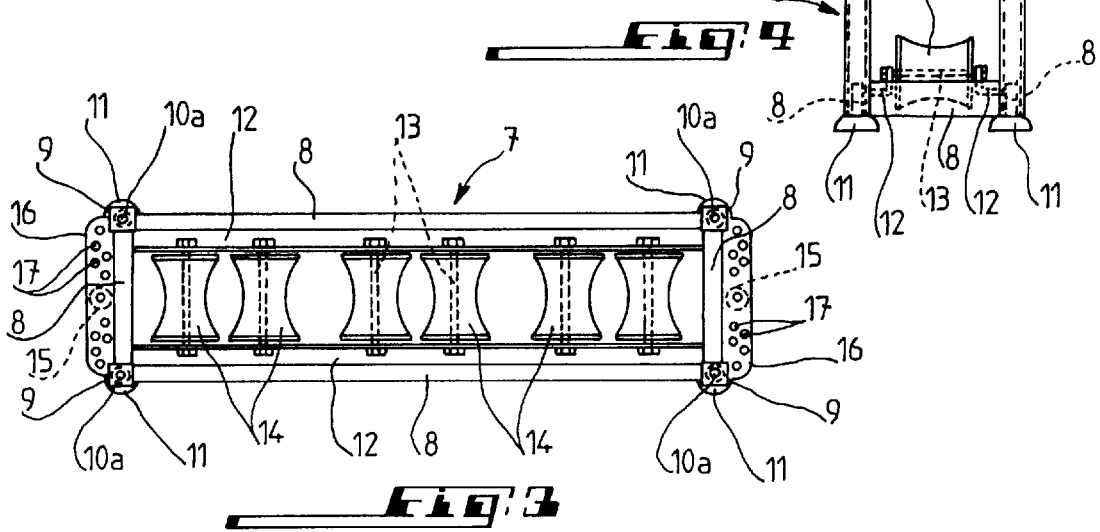
Fig. 3

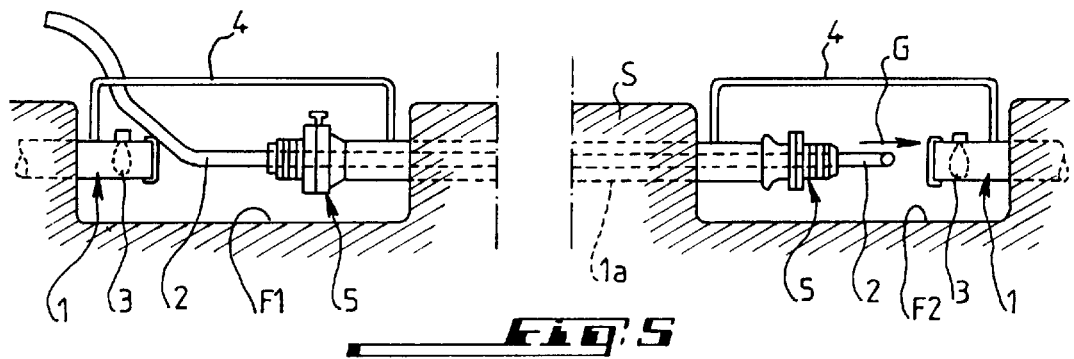
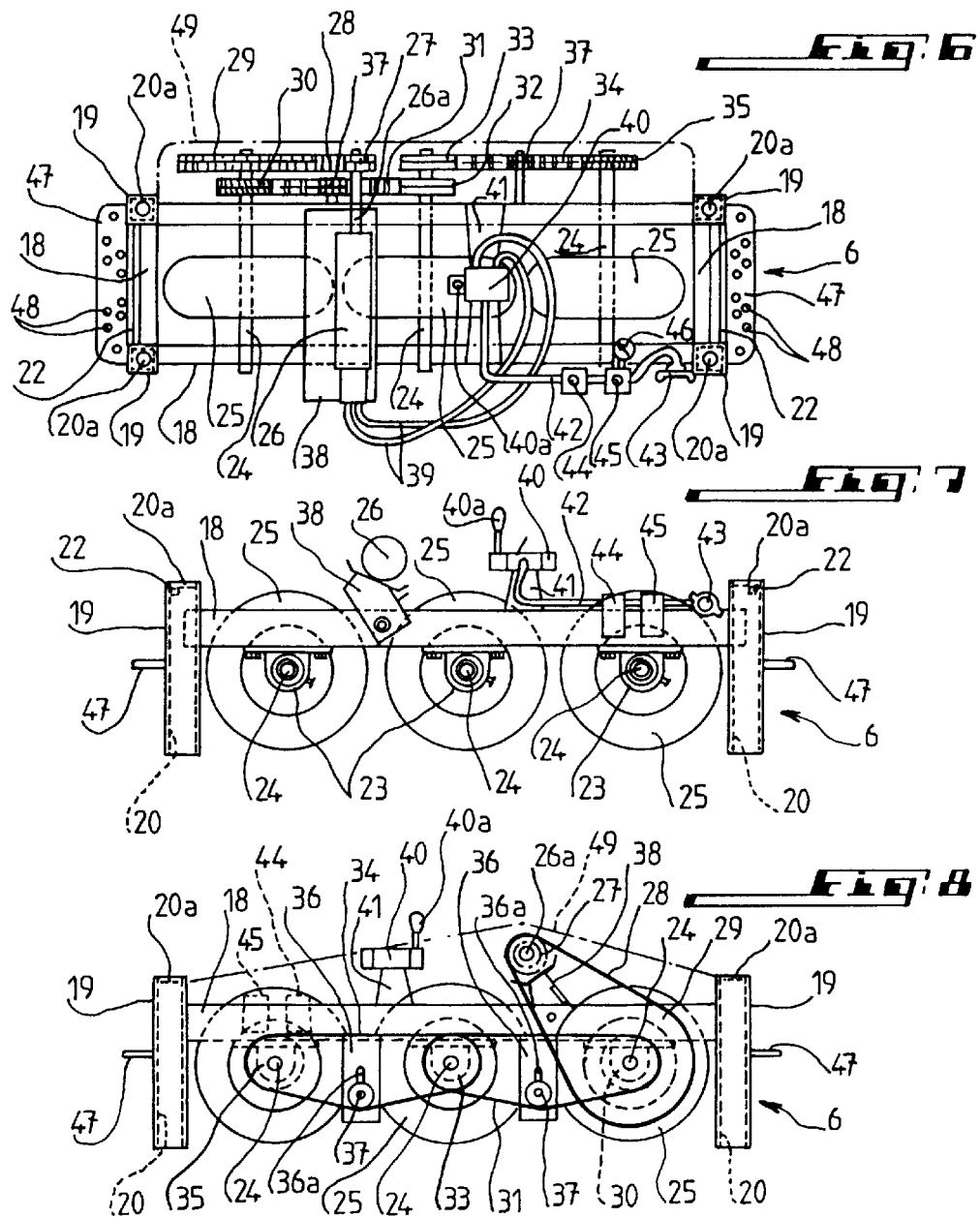

ic drawings given by way of non limitative example only and wherein:

DEVICE FOR PUSHING A TUBE OF PLASTICS MATERIAL FOR INTERNALLY CASING A METAL PIPING TO BE RENOVATED

TECHNICAL FIELD

The present invention relates to a device for pushing or driving a tube made from plastics material such for example as from polyethylene for internally tubing or casing a metal piping to be renovated made for example from cast iron and conveying a fluid such as water or gas.

BACKGROUND ART

In systems of metal pipings hidden, for example buried in a ground or immersed, the fluid-tightness of these pipings may be defective at some sections in view of an excessive local corrosion or of a breakage or failure of the piping thereby requiring its renovation.

A well known method consists in internally jacketing or casing in situ the existing metal piping with a tube made from plastics material thereby avoiding to fully dig up or unearth the piping to be renovated.

FIG. 5 of the attached drawings show a piping 1 buried in a ground S and one section 1a of which has been internally cased with a plastics tubing 2 after two pits or excavations F1 and F2 have been dug out upstream and downstream, respectively, of the section 1a, the arrow G showing the direction of insertion of the tube.

The pits or excavations F1 and F2 uncover portions of piping which are cut through for the insertion of the plastics tubing 2 after having closed the open ends of the piping in a fluid-tight manner, for example with well known inflatable balloons 3.

This casing operation may also be carried out under load or in working condition, i.e. without discontinuing the flow of the fluid by mounting by-pass ducts 4 between or across the different severed piping sections.

Sealing flanges 5, diagrammatically shown in FIG. 5, are mounted onto the ends of the piping section 1a to be cased for the axial guiding of the casing tubing 2.

There is already known a machine for driving or pulling a casing tubing into a piping to be renovated, this machine being usable outside of the dig or pit, i.e. at ground surface level or within the pit, i.e. inside of the ditch F1 or F2.

It is preferable to place this so-called "tube-pushing" machine as near as possible the cut-off piping, i.e. within the pit F1 and in the same alignment to reduce the non-maintained length of the piping made from flexible polyethylene and to improve its being guided.

If indeed the tube puller is fastened outside of the ditch, a substantial length of the piping will be suspended between the machine and the piping, thereby exhibiting many inconveniences in view of the relative flexibility of, the tube to be laid or installed.

A currently known machine comprises clamping jaws mounted onto a frame in alternately sliding relationship under the action of a control jack, the jaws gripping the tubing when they are displaced in a direction to carry along and drive the tubing longitudinally into the piping to be cased and releasing this tubing when they are drawn back in the opposite direction.

This machine however exhibits many inconveniences, for example problems of elastic return of the tubing when it is released by the jaws drawn back in position, risks of damaging the piping by repeated clampings thereof by the jaws or sliding of the latter on the tubing when they meet an obstacle inside of the piping or also problems bound to the discontinuous forward motion or feed of the tubing.

Since indeed the tubings for casing purposes are generally stored onto reels or winder spools, the tubings generally retain a residual curvature during their insertion into the piping to be cased, whereby the forward or leading end of the tubing may be caused to be inserted into a hollow or cavity or a branching off the piping upon each discontinuance or stop of the forward motion or feed of the tubing by the machine during the jaws being drawn back and thus cause the blocking of the tubing within the piping.

An object of the present invention is therefore to remove the aforesaid inconveniences and to provide a device for pushing a tubing of plastics material for internally casing a metal piping, which exhibits a bulk or size reduced enough to be usable in a pit, which exhibits a simpler structure and use and which is adapted to different sizes of tubings.

SUMMARY OF THE INVENTION

For that purpose the subject matter of the invention is a device for pushing a tubing made from plastics material such for example as from polyethylene to internally case a metal piping to be renovated, made for example from cast iron and conveying a fluid such as water or gas, for example, characterized in that it comprises a frame supporting at least one powered train or set of wheels, the drive surface of which is made from rubber for carrying along or driving through friction the plastics tubing and impart a continuous forward or backward motion thereto inside of the metal piping, the train or set of wheels revolving about a direction substantially perpendicular to the displacement of the plastics tubing.

The aforesaid train of wheels may comprise several, for example three wheels with pneumatic tires.

Within the meaning of the invention, the powered set of wheels may be fitted with a for instance pneumatic motor set or driven by hand.

According to another characterizing feature of the invention, the device comprises a second train of wheels either powered or not powered and consisting of a plurality of for example diabolo-shaped rollers so that both aforesaid trains are longitudinally enclosing and gripping the tubing on either side, respectively, thereof.

This second train of wheels may of course be replaced with a flat sliding surface.

The rollers may be made from a metal material and mounted in loose or free idling relationship onto the frame.

According to still another characterizing feature of the invention, the frame consists of an upper subframe and of a lower subframe, which are separable and each one support one of the two aforesaid trains, both subframes being telescopically fitted or nested into each other to adjust their mutual spacing in accordance with the diameter of the casing tubing to be laid.

It should be pointed out that the device of the invention is advantageously portable in view of its low weight and bulk and of its simple structure.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non limiting example only and illustrating a presently preferred specific embodiment of the invention and in which:

FIG. 1 is a perspective view of the device of the invention driving a casing tubing, the motor set having been omitted;

FIG. 2 is a longitudinal elevational view of the lower subframe of the device of FIG. 1;

FIG. 3 is a top view of FIG. 2;

FIG. 4 is an elevational view according to the arrow IV of the subframe of FIG. 2;

FIG. 5 is a diagrammatic view in section showing the casing of a piping section;

FIG. 6 is a top view of the upper subframe of the device of the invention;

FIG. 7 is a longitudinal elevational view of the subframe of FIG. 6; and

FIG. 8 is a view similar to FIG. 7 but showing the opposite side of the upper subframe.

DETAILED DESCRIPTION OF THE PREFERRED EMBODIMENTS

According to the examplary embodiment shown in the drawings, the device of the invention comprises an upper subframe 6 vertically fitted or nested telescopically into a subframe 7.

The subframe 7, which is better visible in FIGS. 2 to 4, is formed of a rectangular sectional framework 8 made fast at its four corners to vertical structural uprights 9 with a square cross section through which vertically extend accomodating passageways 10.

Bases 11, adjustable in height to compensate for the unevennesses of the soil project from underneath the plane of the framework 8 to serve as feet at the aforesaid uprights 9.

Two elongated angle sections 12 are longitudinally fastened to the longest sectional beams of the framework 8 and therebetween support transverse rods 13 onto which are mounted in loose or free rotating relationship rollers 14 with a concave profile of revolution, for example with a diabolo shape.

Two rings 15 are longitudinally projecting from each end of the framework 8 for the anchoring of the subframe 7 into the ground by means for example of stakes or posts (not shown).

Straps (not shown) may also be secured onto the rings 15 for at least partially surrounding the tubing 2 thereby improving its guiding in the device and reducing the load upon the tensioning screws 21 when the device is used in a state suspended from the tubing.

Two transverse plates 16 are fastened to each end, respectively, of the subframe 7 substantially in the plane of the rods 13 and have a plurality of holes 17 drilled through which are intended to receive centering pins (not shown).

The upper subframe 6 will now be described while particularly referring to FIGS. 6 to 8.

Like the lower subframe 7, the upper subframe 6 comprises a rectangular sectional framework 18 made fast at its four corners to four vertical sectional standards 19 with square cross sections and hollows defining vertical thoroughfare accommodating passageways 20.

Each passageway 20 exhibits from its bottom to the vicinity of its top an internal shape which corresponds to the external shape of the vertical uprights 9 of the lower subframe 7, so that the lower uprights 9 may be fitted or nested with some clearance or play inside of the upper standards 19.

FIGS. 2 and 7 clearly show that the passageways 10 and 20 of the lower and upper uprights 9 and 19, respectively, exhibit in the vicinity of their tops tapped threadings 10a and holes with corresponding mating cross sections 20a, respectively, to allow the clamping of both subframes 6 and 7 together with the assistance of tensioning screws 21 shown in FIG. 1.

The cross sections of the holes 20a and of the tapped threadings 10a is of course smaller than that of the vertical passageways 10 and 20.

Two gripping bars 22 are provided on the upper subframe 6 between two vertical standards 19, respectively, at each one of the longitudinal ends of the latter to allow the transport of the upper subframe 6 or of the whole device thereby making it well portable.

Three ball bearings 23 are fastened underneath each lateral side member of the framework 18 to rotatively support three axles 24 onto which are mounted wheels with pneumatic tires 25.

The wheels with pneumatic tires 25 are driven by a for example pneumatic motor 26 through the medium of a train of gearing better shown in FIGS. 6 and 8. The pneumatic motor 26 comprises a turbine shaft 26a made fast to a sprocket wheel 27 driving through the agency of a chain 28 a large driven sprocket wheel 29 which is mounted onto a shaft 24 of a first wheel 25 with a neumatic tire and made fast to for unitary rotation with a driven pinion or small toothed wheel 30 coaxial with the big sprocket wheel 29.

The sprocket pinion 30 meshes with another endless chain 31 for rotating a second pinion 32 mounted onto the shaft 24 of another wheel 25 with a pneumatic tire and made fast to for unitary rotation with another drive pinion 33 coaxial with the driven pinion 32.

The drive pinion 33 meshes with still another chain 34 for rotating a fourth driven sprocket pinion 35 which is mounted onto the axle 24 of the third wheel 25 with a pneumatic tire for unitary rotation therewith.

It should be pointed out that the four pinions 30, 32, 33 and 35 all have the same diameter.

Two lugs 36 (see FIG. 8) are fastened underneath one of the side members of the framework 18, namely the one which is located towards the train of gearing and at the level of, the mid-perpendicular of the spacing distance between the axles of the pneumatic tires to rotatably support small tightener or tensioning pinions 37 which are meshing internally with the chains 31 and 34, respectively.

The shafts of these tightener or tensioning pinions 37 are mounted within elongated adjusting openings 36a through the aforesaid supporting lugs 36.

All the pinions and sprocket wheels may for example have a double toothing and the chains may be provided with double rollers.

The aforesaid train of gearing 27 to 37 could of course be replaced with any other suitable drive means.

The pneumatic control circuit for operating the motor 7 of the device of the invention will now be described.

The aforesaid pneumatic motor 26 may be mounted onto a supporting plate 38 secured crosswise or transversely onto the side members of the framework 18.

The pneumatic motor 26 is connected by cables or fluid flow hose ducts 39 (see FIG. 6) to a pneumatic distribution control box 40 comprising a forward/backward motion operating lever 40a and supported upon the upper subframe 6 by a transverse part 41.

The control box 40 further comprises a leakage flow line (not shown) for pouring the fluid upon the chains with a view to lubricate them and a fluid feed line 42 leading from a compressed air mouth 43.

On the feed line 42 are provided an oil lubricator 44 and a filter 45 associated with a pressure gauge 46.

The upper subframe 6 also comprises two transverse plates 47 which are projecting outwards from the upper subframe 6 at both longitudinal ends thereof and through which are drilled holes 48 for the passage of the aforesaid centering pins.

In the assembled position of the device, the casing tubing 2 is longitudinally accommodated between the upper and lower plates 47 and 16 so that by properly inserting the pins through the aforesaid holes 17 and 48, the tubing may be transversely positioned in order that it rests in the middle of the rollers 14 and be plumb with the pneumatic tires 25.

The radius of the concave surface of the rollers 14 is for example equal to 130 mm and adapted to receive tubes the diameter of which lies between about 32 mm and 200 mm, for example.

FIGS. 6 and 8 diagrammatically illustrate by a chain-dotted line a guard housing 49 for the protection of the motor set and of the associated train of gearing.

In FIG. 1 are also seen at 50 the anchoring points for the supporting plate 38 of the motor 26.

The operation of the device of the invention clearly results from the detailed description which has been made previously.

Although the invention has been described in connection with a particular embodiment, it is quite obvious that it is not limited thereto and that it comprises all the technical equivalents of the means described and their combinations if the latter fall within the scope of the appended claims.

What is claimed is:

1. A device for casing a piping interior by providing a tubing of plastics material inside of the piping, comprising a portable frame made from two subframes that include an upper and lower subframes which are independent from one another and which are adapted to be assembled to each other in a separable manner, a first train of wheels carried by the lower subframe and comprising a plurality of rollers each having a peripheral surface with a peripheral groove therein, said rollers being juxtaposed in a longitudinal vertical mean plane of the lower subframe while extending in a parallel relationship such that the peripheral grooves form a convex support for the tubing, a second train of wheels carried by the upper subframe and comprising a plurality of wheels each having a peripheral surface which is made of a material adapted to frictionally engage the tubing, the wheels of the second train being juxtaposed in a longitudinal vertical mean plane of the upper subframe while extending in a parallel relationship, and drive means associated with the upper subframe for rotatably driving the wheels of the second train, wherein, when the upper subframe is assembled to the lower subframe, the longitudinal vertical mean planes coincide and the first and second trains of wheels maintain the tubing between them longitudinally so that when the wheels of the second train are rotatably driven, the tubing is advanced continuously in an axial direction into the pipe.

2. A device according to claim 1, wherein the wheels of the second train of wheels are made of rubber.

3. A device according to claim 1, wherein the second train of wheels comprises wheels with pneumatic tires.

4. A device according to claim 1, wherein the second train of wheels comprises at least three wheels.

5. A device according to claim 1, wherein the first train of wheels are diabolo-shaped rollers.

6. A device according to claim 5, wherein the diabolo-shaped rollers are metallic and loosely mounted for free rotation in the frame.

7. A device according to claim 1, wherein the upper and lower subframes each have a rectangular sectional shape with vertically extending uprights at each corner, wherein the uprights of the upper and lower subframes are telescopically engageable when assembled.

8. A device according to claim 7, wherein the telescopic engagement of the upper and lower subframes is adjustable to accommodate different sizes of tubing.

* * * * *